United States Patent
El Defrawy et al.

(10) Patent No.: US 9,628,553 B2
(45) Date of Patent: Apr. 18, 2017

(54) MAPPING NETWORK SERVICE DEPENDENCIES

(71) Applicant: The Boeing Company, Chicago, IL (US)

(72) Inventors: Karim El Defrawy, Santa Monica, CA (US); Pape Maguette Sylla, Calabasas, CA (US)

(73) Assignee: THE BOEING COMPANY, Chicago, IL (US)

( * ) Notice: Subject to any disclaimer, the term of this patent is extended or adjusted under 35 U.S.C. 154(b) by 245 days.

(21) Appl. No.: 14/523,473

(22) Filed: Oct. 24, 2014

(65) Prior Publication Data

US 2016/0119213 A1 Apr. 28, 2016

(51) Int. Cl.
*G06F 15/173* (2006.01)
*H04L 29/08* (2006.01)
*H04L 12/24* (2006.01)
*H04L 12/26* (2006.01)

(52) U.S. Cl.
CPC .............. *H04L 67/10* (2013.01); *H04L 41/12* (2013.01); *H04L 41/142* (2013.01); *H04L 43/0858* (2013.01)

(58) Field of Classification Search
CPC ....... H04L 67/10; H04L 41/12; H04L 41/142; H04L 43/0858
See application file for complete search history.

(56) References Cited

U.S. PATENT DOCUMENTS

| | | | | |
|---|---|---|---|---|
| 6,182,136 B1 * | 1/2001 | Ramanathan | ........... | H04L 29/06 709/202 |
| 6,286,047 B1 * | 9/2001 | Ramanathan | ..... | H04L 29/12066 370/229 |
| 6,336,138 B1 * | 1/2002 | Caswell | .................. | H04L 41/12 345/440 |
| 7,697,545 B1 * | 4/2010 | O'Sullivan | ........... | H04L 69/163 370/256 |
| 8,225,282 B1 * | 7/2012 | Massoudi | ................. | G06F 8/34 717/104 |
| 2003/0110253 A1 * | 6/2003 | Anuszczyk | ............... | G06F 8/70 709/224 |
| 2008/0162690 A1 * | 7/2008 | Karagounis | ............. | H04L 12/66 709/224 |
| 2010/0231383 A1 * | 9/2010 | Levine | ............. | H04W 52/0261 340/540 |

OTHER PUBLICATIONS

Natarajan et al., "NSDMiner: Automated Discovery of Network Service Dependencies," INFOCOM, copyright 2012, pp. 2507-2515.

(Continued)

*Primary Examiner* — Jonathan Bui
(74) *Attorney, Agent, or Firm* — Yee & Associates, P.C.

(57) ABSTRACT

A method and apparatus for discovering service dependencies. A plurality of connections is identified between nodes in a data network. A set of connection pairs is identified based on the plurality of connections identified. A set of time series is created for the set of connection pairs using monitoring data received from a plurality of sensors monitoring the data network. Service dependencies may be discovered using the set of time series.

17 Claims, 8 Drawing Sheets

(56) References Cited

OTHER PUBLICATIONS

Chen et al., "Automating Network Application Dependency Discovery: Experiences, Limitations, and New Solutions," 8th USENIX Conference on Operating Systems Design and Implementation, Dec. 2008, pp. 117-130.
Kandula et al., "What's Going on? Learning Communication Rules in Edge Networks," SIGCOMM Aug. 2008, 12 pages.
Bahl et al., "Towards Highly Reliable Enterprise Network Services Via Inference of Multi-level Dependencies," SIGCOMM, Aug. 2007, 12 pages.
Popa et al., "Macroscope: End-Point Approach to Networked Application Dependency Discovery," CoNEXT, Dec. 2009, pp. 229-240.
Fonesca et al., "X-Trace: A Pervasive Network Tracing Framework," 4th USENIX Symposium on Networked Systems Design & Implementation, Apr. 2007, 14 pages.
Barham et al., "Constellation: automated discovery of service and host dependencies in networked systems," Microsoft Research, Apr. 2008, 14 pages.
Brown et al., "An Active Approach to Characterizing Dynamic Dependencies for Problem Determination in a Distributed Environment," 7th IFIP/IEEE International Symposium on Integrated Network Management, May 2001, 14 pages.
Marshall, "CANDID: Classifying Assets in Networks by Determining Importance and Dependencies," Masters Thesis, University of California at Berkeley, Technical Report No. UCB/EECS-2013-64, May 2013, 93 pages.

\* cited by examiner

MAPPING NETWORK SERVICE DEPENDENCIES

BACKGROUND INFORMATION

1. Field

The present disclosure relates generally to networks and, in particular, to nodes in a data network. Still more particularly, the present disclosure relates to a method and apparatus for mapping dependencies between services associated with a data network based on the transfer entropy computed for different service pairings.

2. Background

A data network is a communications network that allows devices to exchange data. An Internet Protocol (IP) network is a data network that uses the Internet Protocol suite to send and receive data. The Internet protocol suite is the computer networking model and set of communications protocols used on the Internet and similar computer networks. The different types of communications protocols in the Internet Protocol suite that may be used include the Internet Protocol (IP), the Transfer Control Protocol (TCP), the User Datagram Protocol (UDP), and other types of protocols. An Internet Protocol network may be implemented using any number of Internet networks, local area networks (LAN), enterprise networks, or other types of networks.

Oftentimes, Internet Protocol networks are based on a client-service model. With a client-service model, a client generates and sends a request to a service and the service handles the request and sends a response back to the client. The clients and services that communicate over an Internet Protocol network may be referred to as nodes. Some Internet Protocol networks may include only nodes that use the Transfer Control Protocol.

Data networks and, in particular, Internet Protocol networks are becoming larger and more complex. Consequently, there is a pressing need for tools to aid network administrators and designers in managing these types of networks. For example, a tool capable of determining dependencies between services may be desirable. A dependency between a first service and a second service may occur, for example, when the first service is reliant upon the second service to fulfill a request received by the first service.

Some currently available tools are capable of identifying service dependencies. However, these currently available tools may be unable to identify a chain of dependencies across more than two services. For example, some of these tools may be unable to determine when a first service depends on a second service, which in turn depends on a third service, to fulfill a request received from a client.

Additionally, some of these currently available tools may not use all of the data that is available to these tools, which may reduce the accuracy of the dependencies identified. Therefore, it would be desirable to have a method and apparatus that take into account at least some of the issues discussed above, as well as other possible issues.

SUMMARY

In one illustrative embodiment, a method for discovering service dependencies is provided. A plurality of connections is identified between nodes in a data network. A set of connection pairs is identified based on the plurality of connections identified. A set of time series is created for the set of connection pairs using monitoring data received from a plurality of sensors monitoring the data network. Service dependencies are discovered using the set of time series.

In another illustrative embodiment, an apparatus comprises a connection manager, a time series builder, and a dependency evaluator. The connection manager identifies a plurality of connections between nodes in a data network. The connection manager further identifies a set of connection pairs based on the plurality of connections identified. The time series builder creates a set of time series for the set of connection pairs. The dependency evaluator discovers service dependencies in the data network using the set of time series.

In yet another illustrative embodiment, a network manager comprises a connection manager, a time series builder, and a dependency evaluator. The connection manager identifies a plurality of connections between nodes in a data network. The connection manager further identifies a set of connection pairs based on the plurality of connections identified. The nodes include a plurality of clients and a plurality of services. The time series builder creates a set of time series for the set of connection pairs using monitoring data received from a plurality of sensors monitoring the data network. The dependency evaluator discovers service dependencies between the plurality of services in the data network using the set of time series.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a network manager capable of identifying the services associated with a data network and discovering dependencies between those services. The illustrative embodiments also recognize and take into account that it may be desirable to have a network manager capable of discovering these dependencies passively. In other words, it may be desirable to have a network manager capable of discovering these dependencies without requiring any active injection of new data in the flow of data across the data network.

The illustrative embodiments recognize and take into account that in some cases, a first client implemented on a first device may generate a request that is sent from a source port of a first device to a destination port of a second device, where the request is then received and serviced by a first service implemented on the second device. Oftentimes, the destination port is pre-designated, whereas the source port is randomly selected.

In some cases, the first service may have a dependency with a second service implemented on a third device. In other words, the first service may need to request information from the second service in order to fulfill the request by the first client. In these cases, the first service may effectively become a "second client" and may generate a request that is then sent from a source port of the second device to a destination port of the third device, where the request is then received and serviced by the second service. Again, the destination port of the third device may be pre-designated, whereas the source port of the second device may be randomly selected.

Because the source port of the second device from which the request generated by the first service is randomly selected, recognizing that the "second client" is the same first service may be more difficult or time-consuming than desired. Consequently, identifying the dependency between the first service and the second service may be more difficult or time-consuming than desired. Thus, the illustrative embodiments recognize and take into account that it may be desirable to have a method and apparatus that allows services and dependencies between pairs of services to be identified more quickly, easily, or accurately than may be currently possible.

Thus, the illustrative embodiments provide a method and apparatus for discovering dependencies between services associated with a data network. In particular, the illustrative embodiments may provide a method and apparatus for discovering these dependencies passively without causing delays in the flow of data across the data network and without injecting new data into the flow of data across the data network.

Figure 1:
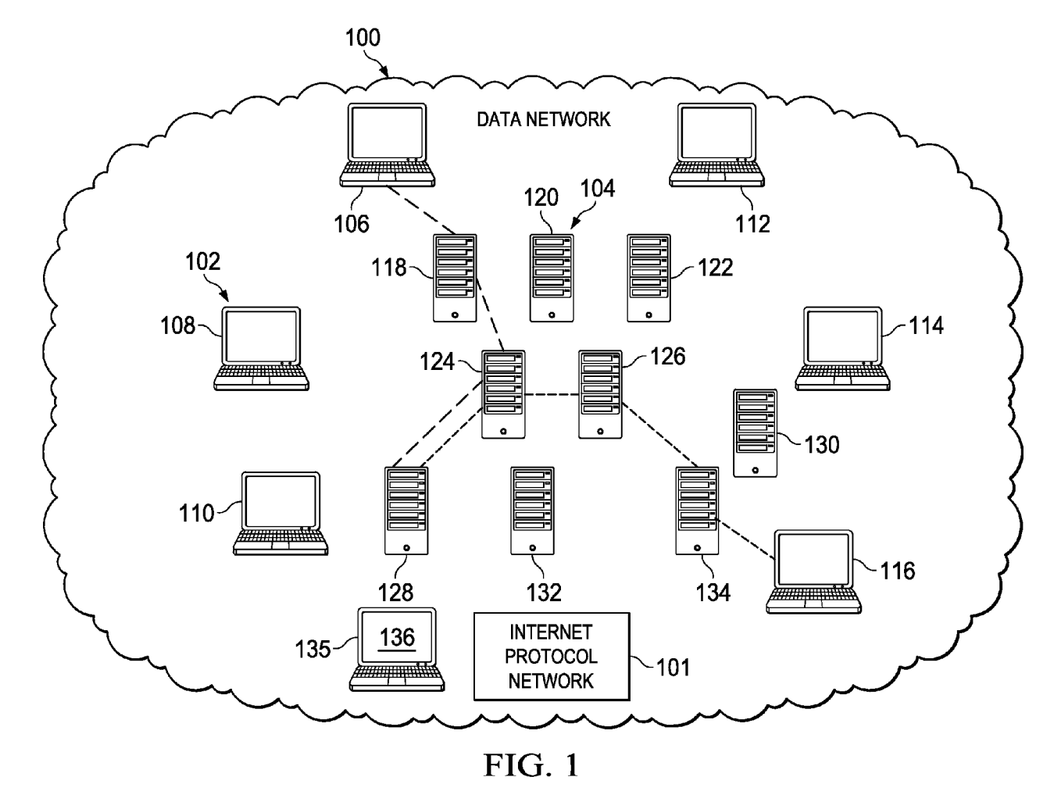
FIG. 1 is an illustration of a data network in accordance with an illustrative embodiment.

Referring now to the figures and, in particular, with reference to FIG. 1, an illustration of a data network is depicted in accordance with an illustrative embodiment. In this illustrative example, data network 100 may take the form of Internet Protocol (IP) network 101 that uses the Transfer Control Protocol/Internet Protocol (TCP/IP) suite. However, in other illustrative examples, data network 100 may take the form of some other type of data network.

Data network 100 may be comprised of any number of Internet networks, local area networks (LAN), enterprise networks, other types of networks, or combination thereof. As one illustrative example, data network 100 may be comprised of a single local area network (LAN). In other illustrative examples, data network 100 may be comprised of an Internet network and two local area networks.

As depicted, plurality of client devices 102 and plurality of service devices 104 may be associated with data network 100. As used herein, being "associated with" a network, such as data network 100, means being part of, connected to, or able to communicate with data network 100 in some other manner. In this illustrative example, a "client device," such as each of plurality of client devices 102 may be any device on which a client is implemented. A "service device," such as each of plurality of service devices 104 may be any device on which a service is implemented.

As depicted, plurality of client devices 102 includes client devices 106, 108, 110, 112, 114, and 116. Plurality of service devices 104 includes service devices 118, 120, 122, 124, 126, 128, 130, 132, and 134. In this illustrative example, a client may be implemented on each of plurality of client devices 102 and a service may be implemented on each of plurality of service devices 104.

Network manager 135 may be used to manage data network 100. In this illustrative example, network manager 135 may be used to detect the services implemented on plurality of service devices 104 and discover dependencies between these services. As depicted, network manager 135 may be implemented on computer system 136. Network manager 135 may be an example of one implementation for network manager 242 described in FIGS. 2-3 below.

Figure 2:
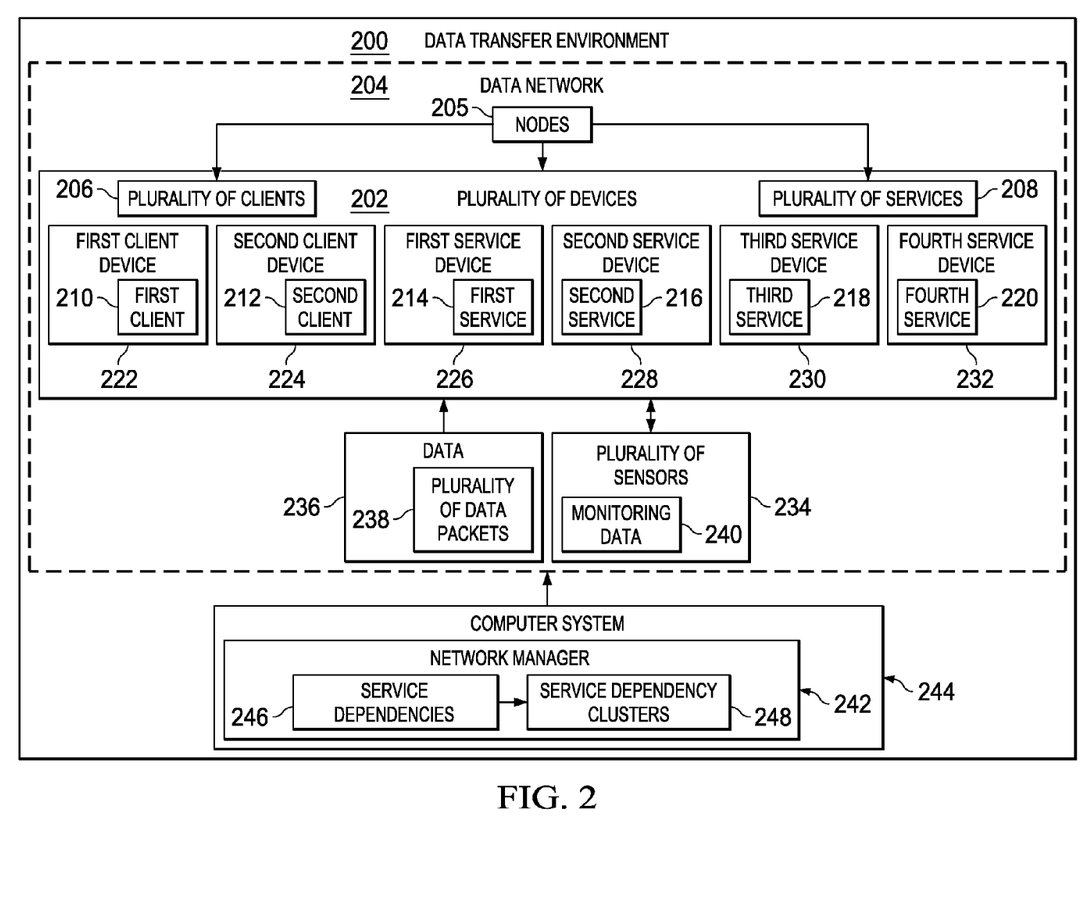
FIG. 2 is an illustration of a data transfer environment in the form of a block diagram in accordance with an illustrative embodiment.

With reference now to FIG. 2, an illustration of a data transfer environment is depicted in the form of a block diagram in accordance with an illustrative embodiment. In this illustrative example, data transfer environment 200 may include plurality of devices 202 associated with data network 204. Data network 204 may be comprised of any number of Internet networks, local area networks (LAN), enterprise networks, other types of data networks, or combination thereof. In other illustrative examples, data network 204 may be simply referred to as a network.

Data network 204 may take the form of an Internet Protocol network. The internet Protocol network may use at least one of the Transfer Control Protocol, the User Datagram Protocol, or some other type of protocol. As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, or item C" or "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Each of plurality of devices 202 may be considered associated with data network 204 by being part of, connected to, or able to communicate with data network 204 in some other manner. Each of plurality of devices 202 may take the form of a computer, a laptop computer, a tablet, a server computer, a smartphone, a processor unit, a switch, a router, or some other type of device capable of sending and receiving data.

Nodes 205 may be implemented on plurality of devices 202. Nodes 205 may include plurality of clients 206 and plurality of services 208. Depending on the implementation, each of plurality of clients 206 and each of plurality of services 208 may be implemented on a different one of plurality of devices 202. In some illustrative examples, more than one of plurality of clients 206 may be implemented on a particular device or more than one of plurality of services 208 may be implemented on a particular device. In other illustrative examples, one or more clients and one or more services may be implemented on the same device. In this manner, at least one of a client in plurality of clients 206 or a service in plurality of services 208 may be implemented on each of plurality of devices 202.

In one illustrative example, plurality of clients 206 includes first client 210 and second client 212 and plurality of services 208 includes first service 214, second service 216, third service 218, and fourth service 220. First client 210, second client 212, first service 214, second service 216, third service 218, and fourth service 220 may be implemented on first client device 222, second client device 224, first service device 226, second service device 228, third service device 230, and fourth service device 232, respectively, of plurality of devices 202.

As depicted, plurality of sensors 234 may be associated with data network 204. Plurality of sensors 234 may be implemented using hardware, software, firmware, or a combination thereof. Each of plurality of sensors 234 may be used to monitor the flow of data between the various clients and services associated with plurality of devices 202. In one illustrative example, plurality of sensors 234 may be implemented using a plurality of Cisco® Netflow sensors, which may be obtained from Cisco Systems, Incorporated.

Depending on the implementation, each of plurality of sensors 234 may be implemented on a corresponding one of plurality of devices 202. In some cases, more than one of plurality of sensors 234 may be implemented on a same device in plurality of devices 202.

Plurality of sensors 234 monitor the flow of data 236 over data network 204 to generate monitoring data 240. In some cases, this monitoring may be referred to as plurality of sensors 234 "listening" to data network 204 to generate monitoring data 240 about data 236 being exchanged over data network 204.

In one illustrative example, data 236 may be exchanged over data network 204 in the form of plurality of data packets 238. Each of plurality of data packets 238 may include at least one of header data or metadata that may be used by plurality of sensors 234 to track the data packet. As one illustrative example, the header data of a particular data packet in plurality of data packets 238 may include a source Internet Protocol address, a destination Internet Protocol address, a source port, a destination port, and a type of protocol. The type of protocol may be, for example, without limitation, the Transfer Control Protocol, the User Datagram Protocol, or some other type of protocol. In some cases, monitoring data 240 may include at least a portion of this header data or metadata.

Plurality of sensors 234 may send monitoring data 240 to network manager 242. Monitoring data 240 may be sent to network manager 242 as monitoring data 240 is received. Depending on the implementation, monitoring data 240 may be sent to network manager 242 continuously or periodically in response to the occurrence of some event. The event may be, for example, the receiving of a command, the generation of a certain amount of monitoring data, the lapse of a timer, or some other type of event.

In this illustrative example, network manager 242 may be implemented in software, hardware, firmware, or a combination thereof. When software is used, the operations performed by network manager 242 may be implemented using, for example, without limitation, program code configured to run on a processor unit. When firmware is used, the operations performed by network manager 242 may be implemented using, for example, without limitation, program code and data and stored in persistent memory to run on a processor unit.

When hardware is employed, the hardware may include one or more circuits that operate to perform the operations performed by network manager 242. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by network manager 242 may be performed using organic components integrated with inorganic components. In some cases, the operations and processes may be performed by entirely organic components, excluding a human being. As one illustrative example, circuits in organic semiconductors may be used to perform these operations and processes.

In this illustrative example, network manager 242 may be implemented using computer system 244. Computer system 244 may be comprised of one or more computers in communication with each other. In other illustrative examples, network manager 242 may be implemented on one of plurality of devices 202.

Network manager 242 may use monitoring data 240 to discover service dependencies 246. Further, network manager 242 may use monitoring data 240 to identify service dependency clusters 248 based on service dependencies 246. The operations performed by network manager 242 are described in greater detail in FIG. 3 below.

Figure 3:
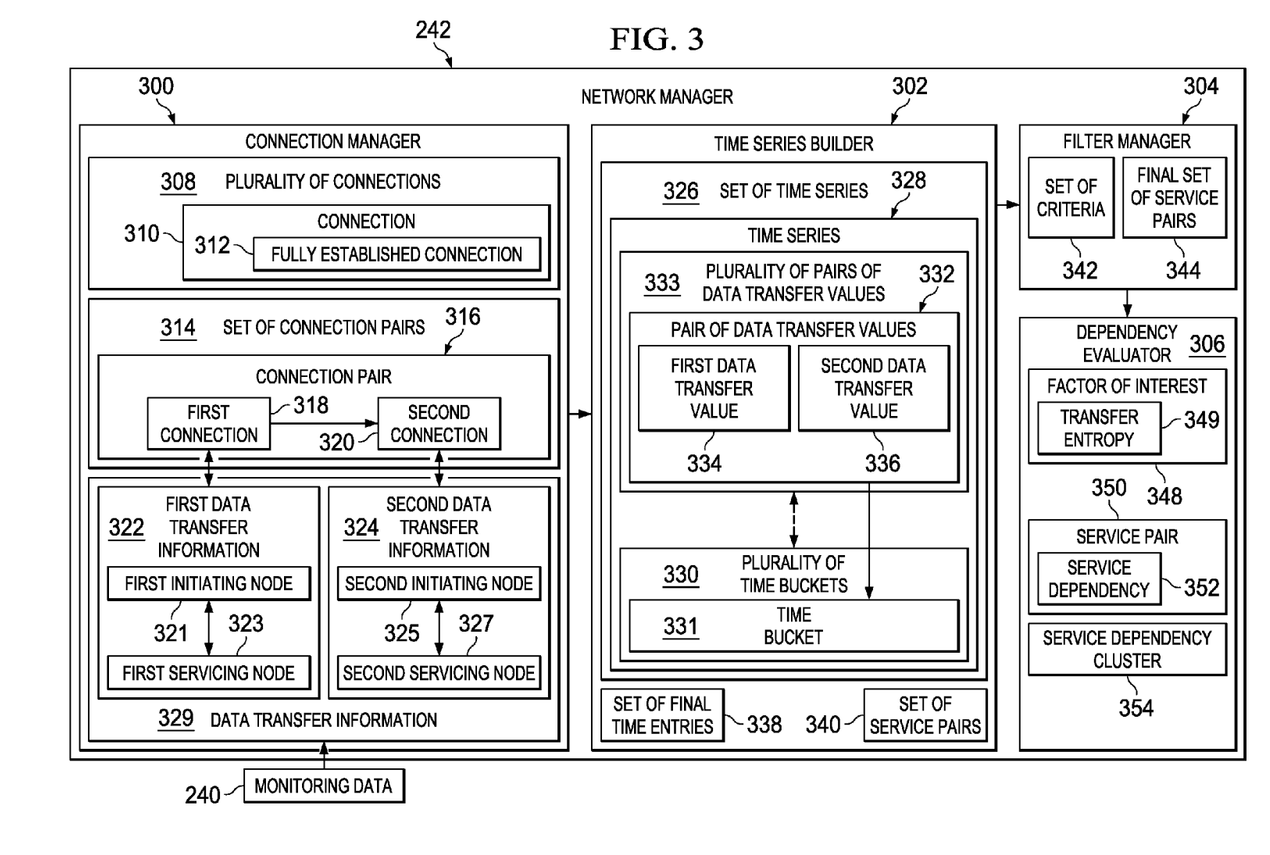
FIG. 3 is an illustration of a network manager in the form of a block diagram in accordance with an illustrative embodiment.

With reference now to FIG. 3, an illustration of network manager 242 from FIG. 2 is depicted in the form of a block diagram in accordance with an illustrative embodiment. In this illustrative example, network manager 242 may include connection manager 300, time series builder 302, filter manager 304, and dependency evaluator 306. Each of connection manager 300, time series builder 302, filter manager 304, and dependency evaluator 306 may be implemented using hardware, software, firmware, or a combination thereof.

As depicted, connection manager 300 may receive monitoring data 240. Connection manager 300 may use monitoring data 240 to identify plurality of connections 308. Connection 310 may be an example of one of plurality of connections 308. Connection 310 may be a connection between an initiating node and a servicing node. The initiating node may be either a client or a service that has become, in effect, an "effective client." The servicing node may be the node that services the one or more requests received from the initiating node.

In one illustrative example, plurality of connections 308 may be a plurality of fully established connections. For example, connection 310 may take the form of fully established connection 312. Fully established connection 312 may be one in which both a source and a destination have completed a "handshake" and established a connection using the Transfer Control protocol. In particular, fully established connection 312 may be one in which the source port on the particular device on which an initiating node is implemented and the destination port on the particular device on which a servicing node is implemented have completed a "handshake" and established a connection using the Transfer Control Protocol.

The source and destination may be identified based on monitoring data 240. For example, monitoring data 240 may include the header data of data packets being sent over data network 204 in FIG. 2. Based on this header data, connection manager 300 may identify those data packets having the same source Internet Protocol address, destination Internet Protocol address, source port, destination port, and protocol as indicating that connection 310 has been established between the source and the destination. The source, which may be the initiating node, may be one of plurality of clients 206 in FIG. 2 or one of plurality of services 208 in FIG. 2. The destination, which may be the servicing node, may be one of plurality of services 208 in FIG. 2. Connection manager 300 may define the destination Internet Protocol address and the destination port as a service in plurality of services 208. In this manner, connection manager 300 may use monitoring data 240 to detect services.

In other illustrative examples, fully established connection 312 may be one in which a bidirectional transfer of data between a source and a destination has been established using the User Datagram Protocol. For example, a transfer of data from an initiating node to a servicing node and a transfer of data back from the servicing node to the initiating node that occur within some selected time period may be considered a bidirectional transfer of data that indicates that fully established connection 312 has been performed.

Connection manager 300 may use plurality of connections 308 to identify set of connection pairs 314. As used herein, a "set of" items may include one or more items. In this manner, set of connection pairs 314 may include one or more connection pairs. Connection pair 316 may be an example of one of set of connection pairs 314. Connection pair 316 may include first connection 318 and second connection 320 from plurality of connections 308.

In one illustrative example, first connection 318 may be between first initiating node 321 and first servicing node 323 and may enable data transfer between first initiating node 321 and first servicing node 323. First initiating node 321 and first servicing node 323 may be considered a client and a service, respectively. In this illustrative example, second connection 320 may be between second initiating node 325 and second servicing node 327 and may enable data transfer between second initiating node 325 and second servicing node 327. Second initiating node 325 and second servicing node 327 may be considered a client and a service, respectively.

Connection manager 300 may evaluate first connection 318 and second connection 320. Connection manager 300 may determine whether a first connection duration of first connection 318 at least partially overlaps with a second connection duration of second connection 320. First connection 318 and second connection 320 may be established as connection pair 316 in response to a determination that the first connection duration of first connection 318 at least partially overlaps with the second connection duration of second connection 320.

In some illustrative examples, first connection 318 and second connection 320 may only be established as connection pair 316 if the time at which second connection 320 starts is after the time at which first connection 318 starts and before the time at which first connection 318 ends. In this manner, connection pair 316 may only be established when second connection 320 is "temporally contained" within first connection 318.

First initiating node 321, first servicing node 323, second initiating node 325, and second servicing node 327 may belong to nodes 205 in FIG. 2. Prior to establishing connection pair 316, it may not be known whether second initiating node 325 is a true client, such as one of plurality of clients 206 in FIG. 2, or an "effective client" that is actually a service, such as one of plurality of services 208 in FIG. 2. Establishing that the second connection duration of second connection 320 at least partially overlap with the first connection duration of first connection 318 may help identify second initiating node 325 as the same service that is first servicing node 323 but functioning as an "effective client."

In one illustrative example, first initiating node 321 may take the form of first client 210 in FIG. 2 and first servicing node 323 may take the form of first service 214 in FIG. 2. Second initiating node 325 may take the form of first service 214 in FIG. 2 and second servicing node 327 may take the form of second service 216 in FIG. 2. In this manner, first connection 318 may be referred to as a client-service connection and second connection 320 may be referred to as a service-service connection.

Connection manager 300 may generate data transfer information 329 for set of connection pairs 314 using monitoring data 240. Data transfer information 329 may include information about the amount of data transferred over each of the connections that form each of set of connection pairs 314.

As one illustrative example, connection manager 300 may generate first data transfer information 322 and second data transfer information 324 for first connection 318 and second connection 320, respectively, of connection pair 316. First data transfer information 322 and second data transfer information 324 may be in the form of amount of data transferred with respect to time.

For example, first data transfer information 322 may take the form of, for example, X(t), where X(t) represents the amount of data transferred over first connection 318 with respect to time t. Further, second data transfer information 324 may take the form of, for example, Y(t), where Y(t) represents the amount of data transferred over second connection 320 with respect to time t.

Both first data transfer information 322 and second data transfer information 324 may capture forward data traffic and reverse data traffic. For example, each $X(t_n)$ may be a value for the amount of data transferred at time $t_n$ from first initiating node 321 to first servicing node 323 or from first servicing node 323 to first initiating node 321. Similarly, each $Y(t_n)$ may be a value for the amount of data transferred at time $t_n$ from second initiating node 325 to second servicing node 327 or from second servicing node 327 to second initiating node 325.

Any number of data transmissions may occur over first connection 318 and second connection 320. Each of these data transmissions may be comprised of the transmission of one or more data packets. In one illustrative example, both X(t) and Y(t) may be discrete series in which time t represents the start time of each data transmission. The values for the amount of data transferred, $X(t_n)$ or $Y(t_n)$, at any time $t_n$, may be determined using monitoring data 240.

Depending on the implementation, these values may be in units of data packets, bytes, kilobytes, or some other measure of data quantity.

Time series builder 302 may use data transfer information 329 to build set of time series 326 for set of connection pairs 314. In particular, set of time series 326 may include a corresponding time series for each of set of connection pairs 314. As one illustrative example, time series 328 of set of time series 326 may correspond to connection pair 316 of set of connection pairs 314.

Time series 328 may be built using first data transfer information 322 and second data transfer information 324. As depicted, time series 328 may include plurality of pairs of data transfer values 333.

At least a portion of plurality of pairs of data transfer values 333 may correspond to plurality of time buckets 330. Each of plurality of time buckets 330 may be created, or defined, based on a particular time interval, $\Delta$. This particular time interval may be selected as, for example, without limitation, the maximum period of time that a given piece of information will take to move from first initiating node 321 to first servicing node 323 over first connection 318 and from second initiating node 325 to second servicing node 327 over second connection 320. This maximum period of time may be estimated based on monitoring data 240.

In one illustrative example, when the time between two consecutive values, such as $X(t_1)$ and $X(t_2)$, is less than the particular time delay, $\Delta$, a time bucket may be defined as the time between $t_1$ and $t_2$. Otherwise, when the time between the two values, $X(t_1)$ and $X(t_2)$, is equal to or greater than the particular time delay, $\Delta$, the time bucket may be defined as the time between $t_1$ and $t_1+\Delta$. In this manner, only one $X(t_n)$ may fall within each of plurality of time buckets 330. In particular, the corresponding time $t_n$ for each $X(t_n)$ may be the start time for each time bucket in plurality of time buckets 330.

Time bucket 331 may be an example of one of plurality of time buckets 330. Time bucket 331 may be defined as beginning at $X(t_n)$. Pair of data transfer values 332 may be an example of one of plurality of pairs of data transfer values 333 identified for time bucket 331. Pair of data transfer values 332 may include first data transfer value 334 and second data transfer value 336. First data transfer value 334 may be the value of $X(t_n)$. Second data transfer value 336 may be the sum of the values of all Y(t) that fall within time bucket 331. When no Y(t) falls within time bucket 331, second data transfer value 336 may be assigned a null value. The null value may be zero.

In some cases, one or more of plurality of pairs of data transfer values 333 may not correspond to a time bucket. For example, in other illustrative examples, pair of data transfer values 332 may not correspond to time bucket 331. When a particular $Y(t_n)$ does not fall within any of plurality of time buckets 330, first data transfer value 334 of pair of data transfer values 332 may be assigned a null value and second data transfer value 336 may be the value of $Y(t_n)$.

Further, for all X(t) during first connection 318 for which there is no corresponding Y(t) because there is no overlapping second connection 320 present at that time, a pair of data transfer values may be identified where the second data transfer value is assigned a null value. For all Y(t) during second connection 320 for which there is no corresponding X(t) because there is no overlapping first connection 318 present at that time, a pair of data transfer values may be identified where the first data transfer value is assigned a null value.

In other illustrative examples, plurality of time buckets 330 may be selected such that each of plurality of time buckets 330 has a same time interval, $\Delta$. For each time bucket, any values of X(t) that fall within the time interval corresponding to that time bucket may be summed to form the first data transfer value for the pair of data transfer values corresponding to that time bucket. Similarly, any values of Y(t) that fall within the time interval corresponding to that time bucket may be summed to form the second data transfer value for the pair of data transfer values corresponding to that time bucket. When no X(t) or Y(t) fall within the time interval corresponding to a particular time bucket, the corresponding data transfer value may be assigned a null value.

All of plurality of pairs of data transfer values 333 together form time series 328. Each of set of time series 326 may include a similar plurality of pairs of data transfer values for the connection pair of set of connection pairs 314 corresponding to that time series.

Once set of time series 326 have been built, time series builder 302 may identify set of final time series 338 for set of service pairs 340. The time series for each of set of connection pairs 314 having a same type of second connection may be combined to form a final time series for the corresponding service pair.

In particular, for any connection pairs in set of connection pairs 314 having a same type of second connection between a same second initiating node and a same second servicing node, the time series for these connections pairs may be combined, or interleaved, to form a final time series. In one illustrative example, these time series may only be combined when the second connection durations for these second connections at least partially overlap. With the assumption that both the second initiating node and the second servicing node being two services that form a service pair, the final time series formed may be considered corresponding to this service pair. In this manner, set of final time series 338 may be identified for set of service pairs 340.

In some illustrative examples, set of final time series 338 and set of service pairs 340 may then be evaluated by filter manager 304 based on set of criteria 342 to form final set of service pairs 344. Set of criteria 342 may include any number of criteria for selectively filtering set of service pairs 340 to form final set of service pairs 344.

For example, filter manager 304 may filter such that only those service pairs having a final time series with at least a certain number of pairs of data transfer values, or points, may be selected. As one illustrative example, only service pairs having a final time series of at least 5, 10, 15, 20, 50, 100, or some other number of pairs of data transfer values may be selected. In some cases, the threshold number of pairs of data transfer values required may be set to be the product of the largest number of X(t) squared for any given connection and the largest number of Y(t) for any given connection. The number of X(t) and the number of Y(t) may be the number of transmissions sent over the corresponding connection.

As another example, filter manager 304 may filter such that only service pairs that were active during a given time of interest may be selected. For example, only service pairs that have at least some minimum number of X(t), Y(t), or both within a particular period of time may be selected.

In yet another example, filter manager 304 may filter such that only service pairs having services corresponding to particular ports are selected. In some cases, filter manager 304 may exclude service pairs having services for which less than some minimum number of connections were established. For example, a service pair having a service with which fewer than three connections were established may be excluded. In this manner, any number of criteria may be used to form final set of service pairs 344.

Dependency evaluator 306 may then evaluate each of final set of service pairs 344 according to some factor of interest 348. In this illustrative example, factor of interest 348 may be transfer entropy 349. In particular, dependency evaluator 306 may compute transfer entropy 349 for each of final set of service pairs 344.

Service pair 350 may be an example of one of final set of service pairs 344. Service pair 350 may have the following final time series:

$$x=\{x(1),x(2),x(3),x(4),\ldots,x(N)\} \quad (1)$$

$$y=\{y(1),y(2),y(3),y(4),\ldots,y(N)\}. \quad (2)$$

Dependency evaluator 306 may compute the joint and conditional probability distribution functions for this final time series as follows:

$$p(y(t+\tau),y^{(k)}(t),x^{(l)}(t)) \quad (3)$$

$$p(y(t+\tau)|y^{(k)}(t),x^{(l)}(t)) \quad (4)$$

$$p(y(t+\tau)|y^{(k)}(t)) \quad (5)$$

where $x^{(l)}(t)=(x(t-l+1),\ldots,x(t))$ is the vector of the time series part x at time t with length l history and $y^{(k)}(t)=(y(t-k+1),\ldots,y(t))$ is the vector of the time series part y at time t with length l history. The probability distribution function may be estimated as follows:

$$\hat{p}(y(t)=y_n,x(t)=x_m)=\frac{1}{N}N_{nm} \quad (6)$$

where N is the total number of points $(x_i, y_j)$ in the final time series and $N_{nm}$ is the number of times that $(x_n, y_m)$ occurs in the final time series. An estimate of conditional probability may then be computed as follows:

$$\hat{p}(y(t)|x(t))=\frac{\hat{p}(y(t),x(t))}{\hat{p}(x(t))}. \quad (7)$$

The transfer entropy may then be computed as follows:

$$TE_{x \to y} = \quad (8)$$
$$\sum_{y(t+\tau),y^{(k)}(t),x^{(l)}(t)} p(y(t+\tau),y^{(k)}(t),x^{(l)}(t))\log\frac{p(y(t+\tau)|y^{(k)}(t)x^{(l)}(t))}{p(y(t+\tau)|y^{(k)}(t))}$$

where TE is transfer entropy 349 for service pair 350 and τ is the time lag in the future.

In response to a determination that transfer entropy 349 for service pair 350 is greater than a selected threshold, service pair 350 may be identified as service dependency 352, meaning that the two services that form service pair 350 may be dependent. In this illustrative example, the selected threshold may be configurable and may be selected by the network administrator. Transfer entropy 349 measures the amount of information being exchanged between the two services that make up service pair 350. Thus, when the amount of information being exchanged is sufficiently high, these two services may be considered dependent. In this manner, any number of service dependencies may be identified for final set of service pairs 344.

In some cases, service dependency cluster 354 may be identified. Service dependency cluster 354 may be identified between two or more service pairs. For example, a first service pair may include a first service and a second service that have been determined dependent. A second service pair may include a third service and a fourth service that have been determined dependent. When the second service and the third service are the same service, these two service pairs may be considered as forming service dependency cluster 354. If a third service pair includes a fifth service and sixth service that have been determined dependent and the fifth service is the same as either the second service of the first service pair or the fourth service of the second service pair, then this third service pair may be added to service dependency cluster 354.

An additional criteria in forming service dependency cluster 354 may be that the connection durations between the different service pairs at least partially overlap with each other. As one illustrative example, using the above-described first service pair and second service pair, the connection duration between the third service and the fourth service of the second service pair may be required to begin after the start of but before the end of the connection duration between the first service and the second service of the first service pair in order for the first service pair and the second service pair to be identified as establishing service dependency cluster 354.

In this manner, any number of service dependency clusters 248 in FIG. 2 may be formed for data network 204 in FIG. 2 by network manager 242. Each of service dependency clusters 248 may take the form of a chain structure or a tree structure, depending on how the dependencies are associated with each other as described above.

The illustrations of data transfer environment 200 in FIG. 2 and network manager 242 in FIGS. 2-3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
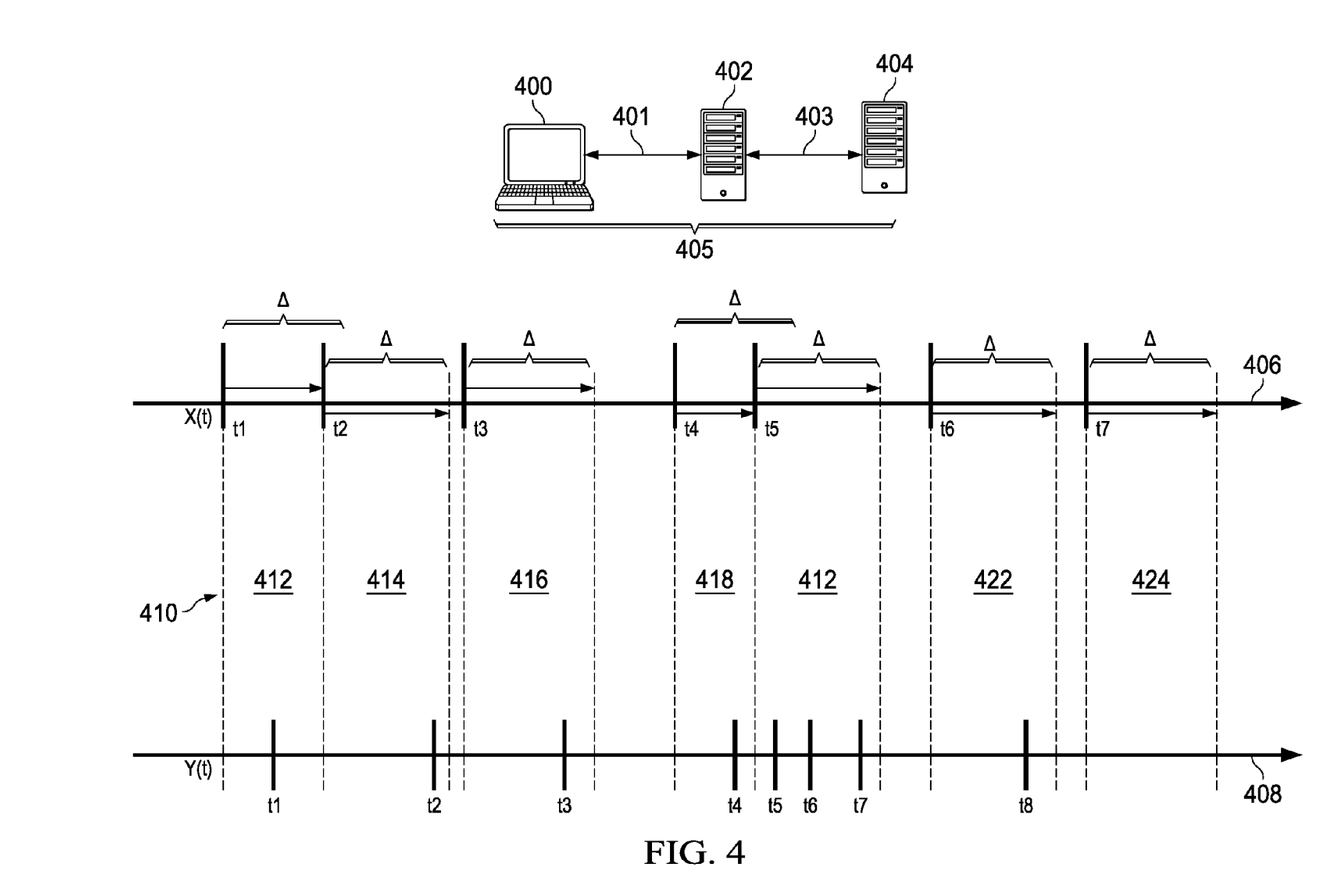
FIG. 4 is an illustration of the building of a time series for a connection pair in accordance with an illustrative embodiment.

With reference now to FIG. 4, an illustration of the building of a time series for a connection pair is depicted in accordance with an illustrative embodiment. In this illustrative example, first connection 401 may be established between client 400 and first service 402. Second connection 403 may be established between first service 402 and second service 404. First connection 401 and second connection 403 may form connection pair 405.

First data transfer information 406, X(t), corresponding to first connection 401 and second data transfer information 408, Y(t), corresponding to second connection 403 are depicted. Plurality of time buckets 410 have been created. Plurality of time buckets 410 may include time buckets 412, 414, 416, 418, 420, 422, and 424.

As depicted, each of plurality of time buckets 410 may begin at the time $t_n$ for each corresponding $X(t_n)$. Each of plurality of time buckets 410 may end at the time $t_{subs}$ for each subsequent $X(t_{subs})$ that follows $X(t_n)$ when $t_{subs}-t_n$ is less than or equal to a selected time delay, Δ, or at time $t_n+\Delta$ when $t_{subs}-t_n$ is greater than the selected time delay, Δ. Depending on the creation of plurality of time buckets 410, zero, one, or more of the values of Y(t) may fall within each of plurality of time buckets 410.

Figure 5:
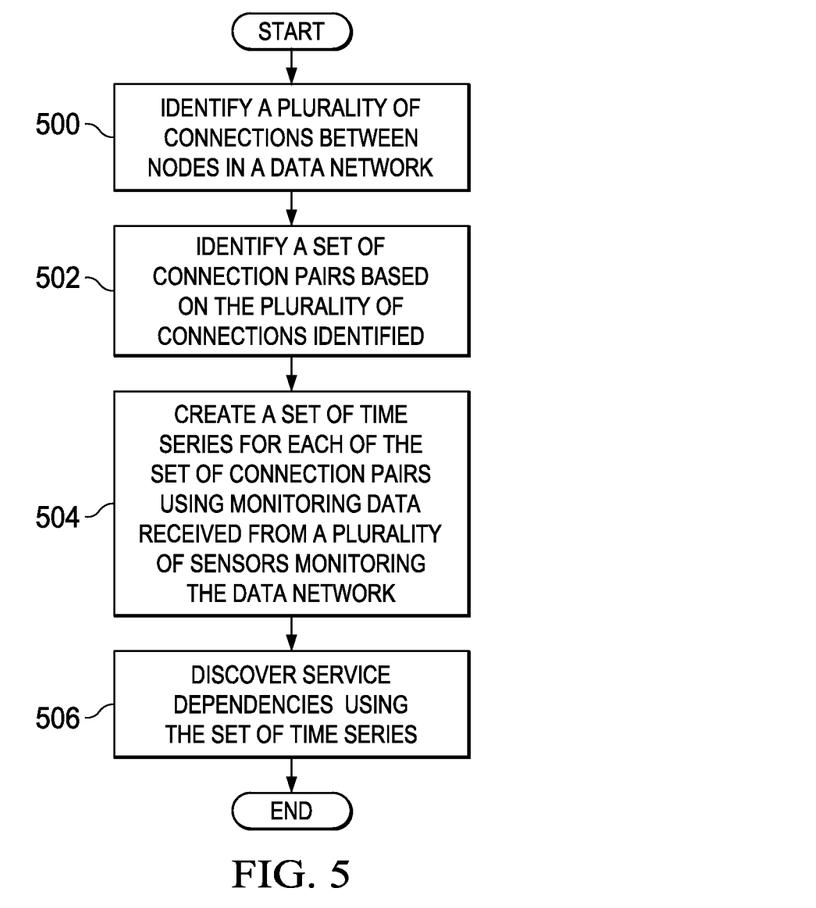
FIG. 5 is an illustration of a process for discovering service dependencies in a data network in the form of a flowchart in accordance with an illustrative embodiment.

With reference now to FIG. 5, an illustration of a process for discovering service dependencies in a data network is depicted in the form of a flowchart in accordance with an illustrative embodiment. The process illustrated in FIG. 5 may be implemented using network manager 242 described in FIGS. 2-3.

The process may begin by identifying a plurality of connections between nodes in a data network (operation 500). Next, a set of connection pairs is identified based on the plurality of connections identified (operation 502). Thereafter, a set of time series is created for each of the set of connection pairs using monitoring data received from a plurality of sensors monitoring the data network (operation 504). Service dependencies are then discovered using the set of time series (operation 506), with the process terminating thereafter.

Figure 6:
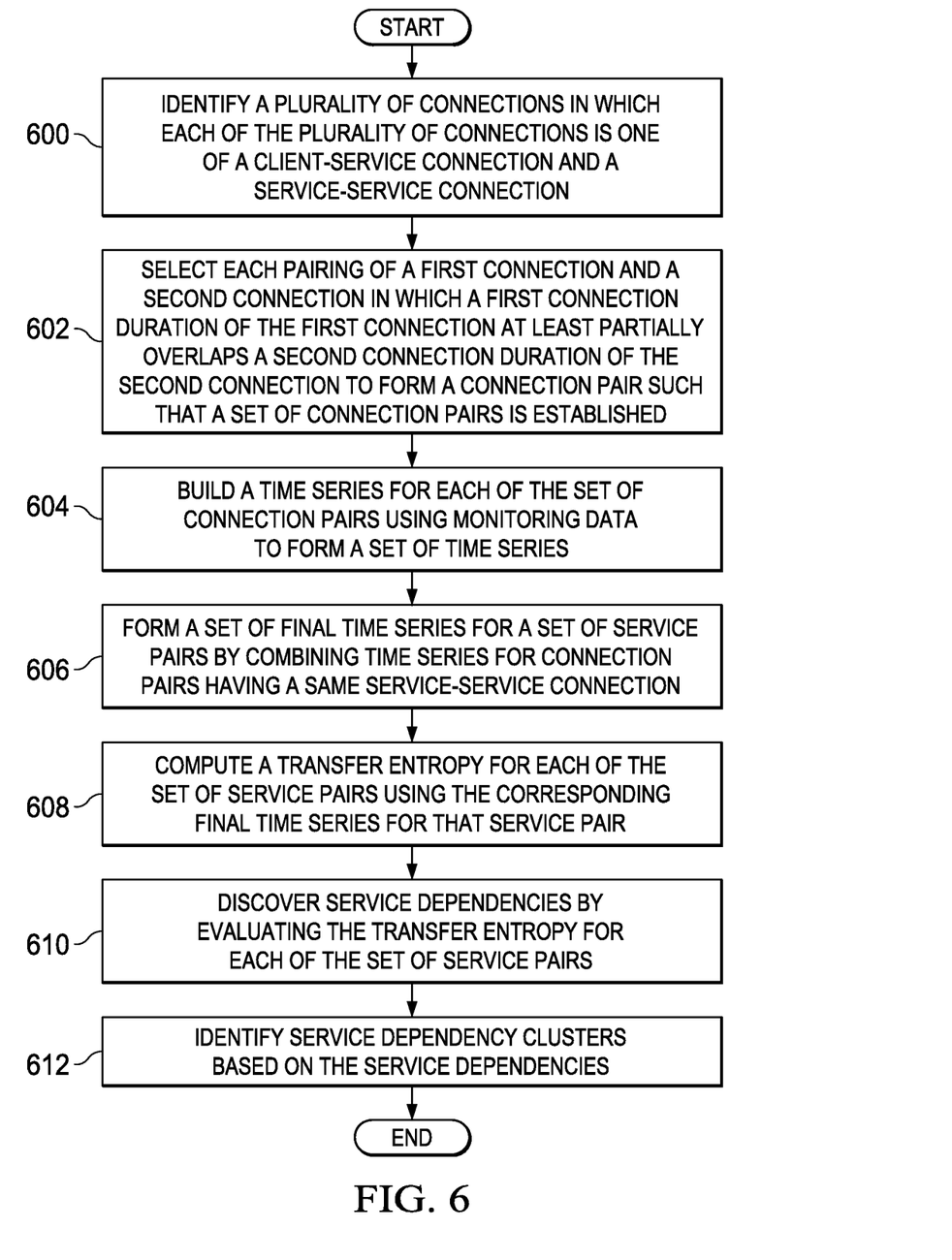
FIG. 6 is an illustration of a process for identifying service dependency clusters in a data network in the form of a flowchart in accordance with an illustrative embodiment.

With reference now to FIG. 6, an illustration of a process for identifying service dependency clusters in a data network is depicted in accordance with an illustrative embodiment. The process illustrated in FIG. 6 may be implemented using network manager 242 described in FIGS. 2-3.

The process begins by identifying a plurality of connections in which each of the plurality of connections is one of a client-service connection and a service-service connection (operation 600). Next, each pairing of a first connection and a second connection in which a first connection duration of the first connection at least partially overlaps a second connection duration of the second connection is selected to form a connection pair such that a set of connection pairs is established (operation 602).

Next, a time series is built for each of the set of connection pairs using monitoring data to form a set of time series (operation 604). Thereafter, a set of final time series is formed for a set of service pairs by combining time series for connection pairs having a same service-service connection (operation 606).

Thereafter, a transfer entropy is computed for each of the set of service pairs using the corresponding final time series for that service pair (operation 608). Then, service dependencies are discovered by evaluating the transfer entropy for each of the set of service pairs (operation 610). Service dependency clusters are identified based on the service dependencies (operation 612), with the process terminating thereafter.

Figure 7:
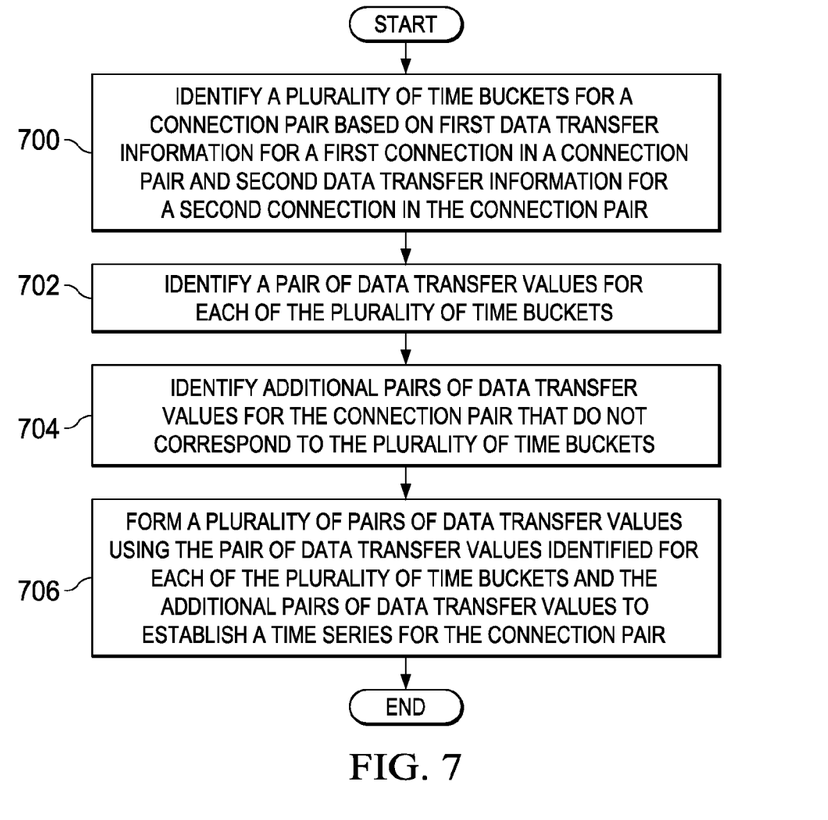
FIG. 7 is an illustration of a process for building a time series for a connection pair in the form of a flowchart in accordance with an illustrative embodiment.

With reference now to FIG. 7, an illustration of a process for building a time series for a connection pair is depicted in accordance with an illustrative embodiment. The process illustrated in FIG. 7 may be implemented using network manager 242 described in FIGS. 2-3.

The process may begin by identifying a plurality of time buckets for a connection pair based on first data transfer information for a first connection in a connection pair and second data transfer information for a second connection in the connection pair (operation 700). Next, a pair of data transfer values is identified for each of the plurality of time buckets (operation 702). Thereafter, additional pairs of data transfer values are identified for the connection pair that do not correspond to the plurality of time buckets (operation 704). The pair of data transfer values identified for each of the plurality of time buckets and the additional pairs of data transfer values form a plurality of pairs of data transfer values that establish a time series for the connection pair (operation 706), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 8:
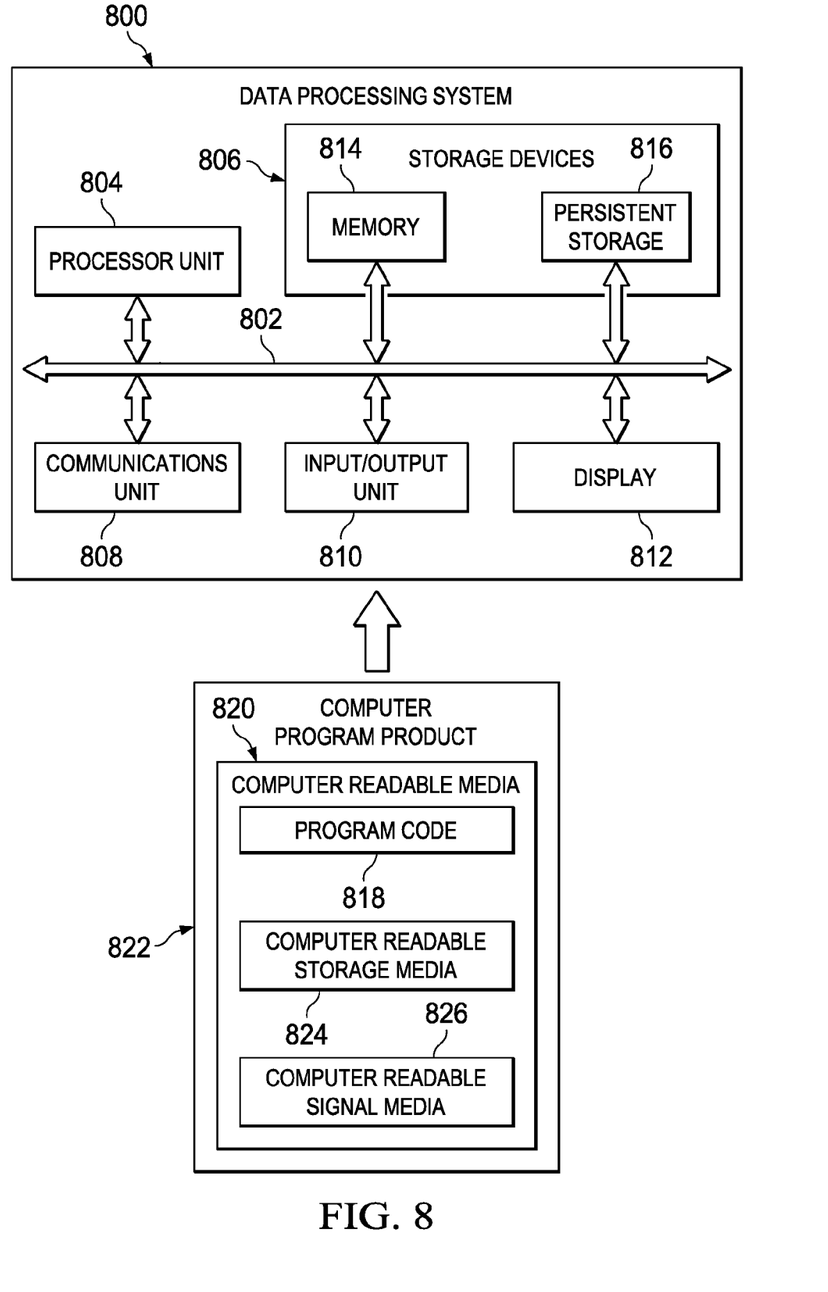
FIG. 8 is an illustration of a data processing system in the form of a block diagram in accordance with an illustrative embodiment.

Turning now to FIG. 8, an illustration of a data processing system is depicted in the form of a block diagram in accordance with an illustrative embodiment. Data processing system 800 may be used to implement computer system 244 in FIG. 2. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise at least one of a number of processors, a multi-processor core, or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications and programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems, devices, or both. Communications unit 808 may provide communications using physical communications links, wireless communications links, or both.

Input/output unit 810 allows input to be received from and output to be sent to other devices connected to data processing system 800. For example, input/output unit 810 may allow user input to be received through a keyboard, a mouse, some other type of input device, or a combination thereof. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, or some other type of signal that can be transmitted over physical communications links, wireless communications links, or both.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

Thus, the illustrative embodiments provide a method and apparatus for discovering dependencies between services across a data network passively. In one illustrative example, a method for discovering service dependencies may be provided. A plurality of connections between nodes in a data network may be identified. The nodes may include any number of clients and any number of services. A set of connection pairs may then be identified based on the plurality of connections identified. A set of time series may be created for the set of connection pairs using monitoring data received from a plurality of sensors monitoring the network. Service dependencies may then be discovered using the set of time series. In some cases, service dependency clusters may then be discovered based on the service dependencies identified.

In particular, services may be identified. Next, service dependencies between these services are discovered. With a service dependency, fulfilling a request received at the first service requires establishing a connection with the second service exchanging data with the second service. Further, the server dependency may be quantized by measuring the amount of data exchanged between the first service and the second service using transfer entropy. Thereafter, clusters of service dependencies may be identified. Using transfer entropy in the process described above enables a more accurate measure of dependency as compared to relying on simple temporal correlations or other types of correlations.

The method and apparatus provided by the illustrative embodiments for discovering service dependencies may aid network administrators in identifying services that may be more important to the stability and operation of the network and in scheduling maintenance for these services. By being able to more accurately determine the dependencies between the services in a data network, network administrators and other types of network operators may be able to provision and manage these networks more efficiently.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for discovering service dependencies, the method comprising:

identifying a plurality of connections between nodes in a data network;

identifying a set of connection pairs based on the plurality of connections identified;

creating a set of time series for the set of connection pairs using monitoring data received from a plurality of sensors monitoring the data network, wherein the time series comprises a plurality of pairs of data transfer values; and discovering the service dependencies using the set of time series;

wherein discovering the service dependencies comprises identifying a set of final time series for a set of service pairs using the set of time series, each service pair comprising two services having a connection duration;

wherein the set of final time series is formed for the set of service pairs by combining time series for connection pairs having a same service-service connection;

wherein discovering the service dependencies comprises computing a transfer entropy for a service pair from the set of service pairs using a corresponding one of the set of final time series; and wherein discovering the service dependencies further comprises identifying a service dependency between a first service in the service pair and a second service in the service pair when the transfer entropy is greater than a selected threshold.

2. The method of claim 1, wherein identifying the set of connection pairs comprises:

determining whether a first connection duration of a first connection in the plurality of connections at least partially overlaps with a second connection duration of a second connection in the plurality of connections; and establishing the first connection and the second connection as a connection pair in the set of connection pairs in response to a determination that the first connection duration at least partially overlaps the second connection duration.

3. The method of claim 2 further comprising:
generating first data transfer information for the first connection and second data transfer information for the second connection using the monitoring data, wherein the first data transfer information and the second data transfer information are used to create a pair of data transfer values for the connection pair.

4. The method of claim 3, wherein creating the set of time series comprises:
creating a plurality of time buckets for the connection pair; and
identifying a plurality of pairs of data transfer values for the connection pair in which at least a portion of the plurality of pairs of data transfer values correspond to the plurality of time buckets.

5. The method of claim 1, wherein identifying the set of final time series for the set of service pairs comprises:
combining time series from the set of time series for any of the set of connection pairs having a same type of second connection between a same initiating node and a same servicing node to form a final time series, wherein the same initiating node and the same servicing node form a service pair corresponding to the final time series.

6. The method of claim 1, wherein identifying the service dependency comprises:
determining whether the transfer entropy is greater than the selected threshold; and
identifying the service pair as the service dependency in response to a determination that the transfer entropy is greater than the selected threshold.

7. The method of claim 1 further comprising:
identifying service dependency clusters based on the service dependencies discovered, wherein a service dependency cluster comprises at least two service pairs, each of the at least two service pairs having a same service.

8. The method of claim 1 further comprising:
filtering the set of service pairs based on a set of criteria to form a final set of service pairs.

9. The method of claim 8 further comprising:
computing a transfer entropy for each of the final set of service pairs using the set of final time series.

10. The method of claim 9, wherein discovering the service dependencies comprises:
discovering the service dependencies in the data network based on the transfer entropy computed for the each of the final set of service pairs.

11. The method of claim 1, wherein identifying the plurality of connections comprises:
monitoring a flow of data over the data network using the plurality of sensors to generate monitoring data; and
identifying a plurality of fully established connections between the nodes using the monitoring data, wherein each of the plurality of fully established connections comprises one of a client-service connection and a service-service connection.

12. The method of claim 1 further comprising:
identifying service dependency clusters based on the service dependencies discovered, wherein a service dependency cluster comprises at least two service pairs, each of the at least two service pairs having a connection duration overlap.

13. An apparatus comprising:
a connection manager that identifies a plurality of connections between nodes in a data network and that identifies a set of connection pairs based on the plurality of connections identified;
a time series builder that creates a set of time series for the set of connection pairs wherein the time series comprises a plurality of pairs of data transfer values; and
a dependency evaluator that discovers service dependencies in the data network using the set of time series, wherein the dependency evaluator computes a transfer entropy for each of a final set of service pairs using the set of time series and identifies a service pair in the final set of service pairs as a service dependency when the transfer entropy computed for the service pair is greater than a selected threshold.

14. The apparatus of claim 13 further comprising:
a plurality of sensors associated with the nodes that provide monitoring data, wherein the monitoring data is used to create the set of time series.

15. The apparatus of claim 13, wherein each of the plurality of connections is one of a client-service connection and a service-service connection.

16. The apparatus of claim 13, wherein the dependency evaluator identifies service dependency clusters based on the service dependencies discovered.

17. A network manager comprising:
a connection manager that identifies a plurality of connections between nodes in a data network and that identifies a set of connection pairs based on the plurality of connections identified, wherein the nodes include a plurality of clients and a plurality of services;
a time series builder that creates a set of time series for the set of connection pairs using monitoring data received from a plurality of sensors monitoring the data network, wherein the time series comprises a plurality of pairs of data transfer values; and
a dependency evaluator that discovers service dependencies between the plurality of services in the data network using the set of time series, wherein the dependency evaluator computes a transfer entropy for each of a final set of service pairs using the set of time series and identifies a service pair in the final set of service pairs as a service dependency when the transfer entropy computed for the service pair is greater than a selected threshold.

* * * * *

UNITED STATES PATENT AND TRADEMARK OFFICE
CERTIFICATE OF CORRECTION

PATENT NO. : 9,628,553 B2  
APPLICATION NO. : 14/523473  
DATED : April 18, 2017  
INVENTOR(S) : Karim El Defrawy and Pape Maguette Sylla Page 1 of 1

It is certified that error appears in the above-identified patent and that said Letters Patent is hereby corrected as shown below:

In the Claims

Column 16, Line 36, change "the" second occurrence to --a--  
Column 18, Line 16, change "the" to --a--  
Column 18, Line 44, change "the" to --a--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*